United States Patent [19]

Ferraris et al.

[11] 4,399,054

[45] Aug. 16, 1983

[54] CATALYST COMPONENTS AND CATALYSTS FOR THE POLYMERIZATION OF ALPHA-OLEFINS

[75] Inventors: Mario Ferraris, Novara; Francesco Rosati, Milan; Sandro Parodi, Oleggio; Enzo Giannetti, Novara; Giuseppe Motroni, Galliate; Enrico Albizzati, Arona, all of Italy

[73] Assignee: Montedison S.p.A., Milan, Italy

[21] Appl. No.: 226,837

[22] Filed: Jan. 21, 1981

Related U.S. Application Data

[63] Continuation of Ser. No. 68,395, Aug. 21, 1979, abandoned.

[30] Foreign Application Priority Data

Aug. 22, 1978 [IT] Italy ................................ 26908 A/78

[51] Int. Cl.$^3$ .......................... C08F 4/02; C08F 4/64
[52] U.S. Cl. ........................... 252/429 B; 252/429 C; 526/125
[58] Field of Search ..................... 252/429 B, 429 C

[56] References Cited

U.S. PATENT DOCUMENTS

| | | | |
|---|---|---|---|
| 3,594,330 | 7/1971 | Delbouille et al. | 252/429 A |
| 3,769,233 | 10/1973 | Hermans et al. | 252/429 B X |
| 3,953,414 | 4/1976 | Galli et al. | 252/429 C X |
| 4,098,979 | 7/1978 | Maemoto et al. | 252/429 B X |
| 4,107,413 | 8/1978 | Gianni et al. | 252/429 C X |
| 4,149,990 | 4/1979 | Giannini et al. | 252/429 B |

FOREIGN PATENT DOCUMENTS

1589983 5/1981 United Kingdom .

*Primary Examiner*—Patrick Garvin

[57] ABSTRACT

Catalyst components which comprise the reaction product of a Ti compound and a Mg dihalide and which are in the form of spherical particles having an average diameter of 1 to 100 microns, a surface area of 300 to 500 m$^2$/g, and a porosity of 0.3 to 0.4 cc/g are disclosed, as are catalysts also in the form of spherical particles prepared therefrom and useful in the polymerization of ethylene and of alpha-olefins $CH_2=CHR$ in which R is alkyl radical having from 1 to 6 carbon atoms, and the polymerization of the alpha-olefins therewith.

6 Claims, No Drawings

CATALYST COMPONENTS AND CATALYSTS FOR THE POLYMERIZATION OF ALPHA-OLEFINS

This is a continuation of application Ser. No. 68,395, filed Aug. 21, 1979 and now abandoned.

THE PRIOR ART

Catalysts endowed with high activity and high stereospecificity in the polymerization of alpha-olefins are known. Components essential for the preparation of said catalysts are: an Al-alkyl compound partially complexed with an electron-donor compound, and a halogenated Ti compound, preferably in the form of a complex with an electron-donor compound supported on a Mg dihalide. Some examples of these catalysts are described in Belgian Pat. No. 848,527.

The high stereospecificity and the highly active catalysts known sofar do not allow, however, to obtain polymers having a controlled morphology and, more particularly, in the form of particles having a high flowability and a narrow particle size distribution. In general, the polymers prepared with such catalysts have a rather broad particle size distribution curve and do not possess a high flowability.

The greatest part of the particles have a size comprised between 1000 and 100 microns. However, there are present also significant fractions having a size above 1,000 microns and below 100 microns.

Therefore, there has been a definite need in the art for the polymerization of olefins, of catalysts with a high activity which would allow to obtain polymers in the form of particles with high flowability and a narrow particle size distribution. Moreover, in the case of the alpha-olefins, the catalysts must also have a high stereospecificity.

U.S. Pat. No. 3,953,414 describes polymerization catalysts that allow to obtain olefin polymers in the form of spheroidal particles having a controlled particle size distribution.

The activity and stereospecificity of said catalysts are not, however, sufficiently high for practical use.

THE PRESENT INVENTION

An object of this invention is to prepare catalysts having a high activity and endowed also with a high stereospecificity when required, that are useful for preparing olefin polymers having high flowability and in the form of particles having a controlled particle size distribution.

This and other objects are achieved by the catalysts prepared from the carriers and from the catalytic components of this invention.

The new catalytic components which comprise the reaction product of a Ti compound with a Mg dihalide are in the form of spherical particles having an average diameter comprised between 1 and 100 microns, a surface area comprised between 300 and 500 m$^2$/g and a porosity comprised between 0.3 and 0.4 cubic cm/g, and are capable of forming catalysts for the polymerization of olefins. Said catalysts, when used in a standard test for the polymerization of propylene, yield polymers in the form of spherical particles having a flowability comprised between 12 and 15 seconds (determined according to ASTM 1895-69 Method A) and a bulk density higher than 0.4 g/cm$^3$.

The catalyst components that are the object of this application are prepared by reacting a Ti compound with a carrier consisting of or comprising an anhydrous Mg dihalide in the form of spherical particles having an average diameter comprised between 1 and 100 micron, a surface area greater than 500 m$^2$/g, more particularly comprised between 700 and 900 m$^2$/g, and a porosity greater than 0.5 cc/g.

Said components can be also prepared by reacting a halogenated Ti compound containing at least one Ti-halogen bond, more particularly a Ti tetrahalide, such as for example, TiCl$_4$, with an adduct MgX$_{2n}$·ED, wherein X is a halogen, n is a number from 1 to 3 and ED is an electron-donor compound preferably containing active hydrogen atoms, such as for example alcohols, phenols and water, obtained according to the method described in the published German patent application No. (DE-OS-2924029 filed June 13, 1979, and corresponding to U.S. application of Mario Ferraris et al., Ser. No. 47,908 filed June 12, 1979.

This method consists essentially in forming an emulsion of an adduct by causing a homogeneous mixture of the molten adduct and of a liquid that is immiscible with and does not react with the adduct, to pass through a pipe under turbulent conditions and in quenching the emulsion at the outlet of the pipe, thereby causing an immediate solidification of the adduct.

Among the catalyst components of this invention, those suitable for the stereospecific polymerization of the alpha-olefins are prepared by reacting (a) a Ti compound, (b) a support as above defined and (c) an electron-donor compound capable of forming addition compounds with the Ti compound.

Catalytic components particularly suitable for the stereospecific polymerization of the alpha-olefins comprise the reaction products obtained by reacting (a) a Ti compound selected from the halogenated compounds containing at least one Ti halogen bond, especially those of tetravalent Ti, with (b) a carrier whose surface area and porosity are respectively comprised between 700 and 900 m$^2$/g and between 0.5 and 0.7 cc/g, in which at least 80% of the particles have a particle size comprised between 10 and 30 micron, or with (b1) which is an adduct MgX$_2$·nED, wherein X, n and ED are as defined above, obtained according to the method described in the German patent application No. DE-OS-2924029, and with (c) an electron-donor compound which does not contain active hydrogen atoms, preferably selected from the class of esters of organic and inorganic oxygenated acids, in particular from the esters of aromatic acids.

Halogenated Ti compounds particularly suitable for the preparation of the catalyst components of this invention are the Ti tetrahalides, more particularly TiCl$_4$, TiBr$_4$ and TiI$_4$.

However, the haloalcoholates and halophenolates, such as, for instance Ti(O-n-C$_4$H$_9$)$_2$Cl$_2$, TiOC$_2$H$_5$Cl$_5$, and Ti(OC$_6$H$_5$)$_2$Cl$_2$, may also conveniently be used. Examples of non-halogenated Ti compounds are the tetra-alcoholates, for instance Ti(O-n-C$_4$H$_9$)$_4$. The non-halogenated Ti compounds are used in general for preparing catalysts for the polymerization of ethylene.

The carrier may contain, besides Mg dihalides, also organic or inorganic solid co-carriers which are inert towards the Mg compounds, especially compounds of a metal of the III and IV group of the Mendelyeev Periodic System, such as, for instance, SiO$_2$, Al$_2$O$_3$, B$_2$O$_3$, ZrO$_2$, TiO$_2$; or from those of a metal of Group I and II, such as, for instances, Na$_2$CO$_3$, NaCl, Na$_2$SO$_4$, MgO, MgCO$_3$, Mg(OH)Cl, CaCl$_2$.

Electron-donor compounds (c) suitable for the above indicated purpose are, besides the esters of oxygenated acids, ketones, aldehydes, ethers, amides, compounds of phosphorus such as phosphines and phosphoramides. The preferred compounds are the alkyl esters of aromatic acids. Typical examples of these esters are the alkylbenzoates, alkyltoluates and alkylanisates.

Ethylbenzoate, methyltoluate and methylanisate are compounds representative of those preferred compounds. The esters may also be used in the form of adducts with halides of Lewis acids different from the Mg dihalides.

The Al- and Sn-halides, and in particular $AlCl_3$, are examples of useful Lewis acids.

The electron-donor compounds (c) is preferably reacted with the carrier before the reaction with the Ti compounds. It is possible, however, to react the Ti compound, the carrier and the electron-donor compound (c) simultaneously.

It is also possible to react the Ti compound with the carrier and then to treat the solid reaction product with the electron-donor compound (c).

The Ti compound may also be reacted in the form of an addition compound with the electron-donor compound (c).

The reaction between (a), (b) and (b1) and (c) is conducted under such conditions that the quantity of electron-donor compound (c), present in a combined form in the solid product separated from the reaction mixture, is less than 1 mole per gram atom of Mg, in particular so that the quantity is comprised between 0.1 and 0.3 moles per gram atom of Mg.

The molar ratio between the electron-donor compound (c) and the Ti compound is comprised between 0.2 and 3, preferably between 0.5 and 1.5.

In order to increase the catalytic activity and the stereospecificity, it is important that less than 50% by weight of the tetravalent Ti compounds contained in the catalyst component is extractable with $TiCl_4$ at 80° C. Preferably, the extractable Ti compounds should be less than 20% by weight.

It has now been found, and this is another aspect of this invention, that the reaction product of the Ti compound and the carrier, containing or not containing the electron-donor compound (c), maintains the morphology of the carrier, while the surface area and the porosity are decreased. The porosity is comprised between 0.3 and 0.4 cc/g while the surface area is comprised between 300 and 500 $m^2/g$, preferably between 350 and 400 $m^2/g$.

It has furthermore been found that the catalyst components thus obtained form catalysts for the polymerization of olefins, which catalysts, when used in a standard polymerization test as defined infra, yield polymers in the form of spherical particles endowed with a flowability lower than 16 seconds, more particularly comprised within the range of 12–15 seconds, and showing a bulk density higher than 0.4 g/cc, preferably comprised between 0.45 and 0.5 g/cc. By the term "standard polymerization test" is meant a propylene polymerization test as carried out in Example 1, infra.

The carrier is prepared from adducts of formula $MgX_2 \cdot nED$, wherein X is a halogen atom, n is a number from 2 to 6 and ED is an electron-donor compound preferably containing active hydrogen atoms, such as for instance alcohols, phenols and water, which adducts are in the form of spherical particles having an average diameter comprised between 1 and 100 microns and are obtained according to the method described in German patent application No. DE-OS-2924029, filed June 13, 1979.

Still another method for preparing adducts suitable for obtaining the carrier consists in forming an emulsion of the adduct with an immiscible liquid that does not react with the adduct, under conditions of vigorous stirring, such as for instance those obtainable with an Ultra Turrax T-45 N rotating at 10,000 RPM (Janke & Kunkel K. G. IKA Werke) apparatus, and then by quenching the emulsion, thereby causing an immediate solidification of the adduct.

The adducts thus obtained may be treated by various methods in order to obtain the components of the catalysts of this invention.

As already indicated, the catalyst components of this invention may be obtained also by reacting the adducts directly with the Ti compound. In this invention, the adduct contains preferably less than 3 moles of electron-donor, for instance from 2 to 2.5 moles. These adducts may be prepared by removing electron-donor from the adducts containing more than 3 moles of electron-donor.

The reaction with the Ti compound is carried out either by adding the solid adduct to undiluted $TiCl_4$ maintained at a temperature between about 0° C. and 100° C. or by operating in a hydrocarbon diluent, at relatively low temperatures, for example lower than 40° C. The solid reaction product separated from the reaction mixture is then caused to react with a liquid Ti compound, preferably $TiCl_4$, at temperatures comprised between 80° and 135° C.

The solid reaction product is separated from the excess of the Ti compound, at temperatures at which the undesirable Ti compounds that are extractable at 80° C. with $TiCl_4$, remain dissolved in the reaction medium and are removed together therewith. When the $TiCl_4$ is used as a reaction medium, the separation of the solid is carried out at temperatures usually higher than 80° C. It is possible, however, to operate at lower temperatures, provided that there are used quantities of $TiCl_4$ sufficient for dissolving the undesired Ti compounds. It is also convenient to carry out the treatment with $TiCl_4$ more than once.

The solid is separated from the reaction mixture and is then washed with an inert hydrocarbon diluent (hexane, heptane, etc.,) in order to remove the last traces of unreacted Ti compound.

When the adduct is directly reacted with the Ti compound in order to prepare a catalytic component for the stereoregular polymerization of alpha-olefins, the adduct, before the reaction with the Ti compound, is reacted with an electron-donor compound (c) at a temperature between about 0° C. and 100° C. or the electron-donor compound (c) is reacted simultaneously with the Ti compound and with the adduct. The electron-donor compound (c) can be introduced during the preparation of the microspheroidal adduct. In these reactions, it is necessary that the quantity of electron-donor compound (c) that remains fixed on the catalyst component after extraction with $TiCl_4$ at 80° C. for 2 hours, is at least comprised between 0.5 and 3 moles/gram atom of Ti. Moreover, it is important that the catalyst component contains less than 50%, but preferably less than 20%, of the Ti compound extractable with $TiCl_4$ at 80° C.

After direct reaction of the adducts with the Ti compound, the particle size distribution is comprised within a narrow range of values. In general, at least 80% of the particles have dimensions comprised within the range of 10–30 micron, but in particular between 15 and 25 micron.

The reaction between the Ti compound and the carrier, or the adduct thereof with an alcohol, a phenol or with water, is carried out by suspending the carrier in a liquid reaction medium which may consist of said liquid Ti compound or of the solution thereof in an inert hydrocarbon diluent. The reaction is preferably conducted by using, as reaction medium, the liquid Ti compound.

The temperature is in general comprised between room temperature and 150° C. In the case of $TiCl_4$, it is possible to operate at its boiling temperature or at lower temperatures, for instance between 80° and 120° C. In general, it is preferable to operate between 110° and 135° C.

The reaction between the electron-donor compound (c) and the carrier or the adduct $MgX_2 \cdot nED$ (in the case in which the electron-donor compound (c) is made to react before the reaction with the Ti compound) is in general carried out by suspending the carrier in a hydrocarbon solution containing the electron-donor compound (c) and by conducting the reaction at temperatures comprised between room temperature and 100° C., preferably between 40° and 80° C.

The solid reaction product, separated or not, from the liquid phase, is reacted with the Ti compound.

The reaction between the adduct and the halogenated agent is also carried out by suspending the adduct in a liquid medium consisting of said halogenating agents, or from a solution thereof and by conducting the reaction generally within a temperature range comprised between room temperature and 150° C.

The solid product is separated from the reaction mixture, then washed and lastly reacted with the electron-donor compound (c) and/or with the Ti compound.

As explained above, the electron-donor compound (c) may also be added during the treatment with a halogenating agent.

The catalyst components according to this invention are mixed with organometallic compounds of a metal belonging to groups II and III of the Mendelyeev Periodic System to form catalysts particularly active in the polymerization of olefins.

The polymers obtained using said catalysts are in the form of spherical particles of high flowability, show a flow index below 16 seconds, more particularly between 12 and 15 seconds (the index was measured according to ASTM 1895-69 Method A). The bulk density is comprised between 0.4 and 0.5 g/cm$^3$ (determined according to ASTM 1895-69 Method A).

More particularly, when the catalyst solid component contains an electron-donor compound (c) and when as co-catalyst there is used an Al-organometallic compound partially complexed with an electron-donor compound (c), it is possible to obtain catalysts suitable for the polymerization of alpha-olefins, that show a high activity and stereospecificity and which, moreover, yield polymers, such as polypropylene, in the form of particles having a high flowability and a narrow particle size distribution.

The electron-donor compounds (c), suitable for being complexed with the Al organometallic compounds, belong to the same classes as the previously described electron-donor compounds (c).

The quantity of electron-donor compound (c) is preferably such that at least 10% or more, in particular between 20% and 80%, of the organometallic Al-compound is in the form of a complex.

Preferably there are used the alkyl esters of aromatic acids such as, for instance, the esters of benzoic or toluic acid and the like.

As Al compounds there are preferably used Al-trialkyls, such as for instance Al-triethyl, Al-triisobutyl, etc. Further examples of useful Al-alkyl compounds are described in British Pat. No. 1,387,890. The Al-trialkyls can also be used in admixture with dialkyl-Al halides.

The Al-Ti ratio in the catalysts suitable for the stereospecific polymerization of the alpha-olefins in general is comprised between 10 and 1,000. Al/Ti ratios lower than 10 may be used provided that the electron-donor compound (c) is not used or that it is used in a quantity below 20% by moles with respect to the Al alkyl compound.

In the polymerization of the olefins with the catalysts according to this invention the polymerization conditions are those known in the prior art.

The polymerization may be conducted in the liquid phase either in the presence or absence of an inert hydrocarbon solvent (e.g., hexane, heptane, etc.), or in the gaseous phase.

The polymerization temperature in general is comprised between 40° and 150° C., particularly between 50° and 90° C.

More particularly, propylene or mixtures thereof with minor quantities of ethylene, for example lower than 25%, are polymerized with the stereospecific catalysts of this invention.

The alpha-olefins $CH_2=CHR$ in which R is an alkyl containing from 1 to 6 carbon atoms include propylene, butene-1, 4-methyl-pentene-1. Mixtures of th- alpha-olefins with minor amounts of ethylene can be polymerized with the aid of the present catalysts, as noted supra.

The polymers obtained with the catalysts of this invention, besides being in the form of spheric particles having high characteristics of flowability, are endowed with high characteristics of surface area and of porosity, whereby they offer the advantage, with respect to the polymers known heretofore, of fixing more easily the additives such as stabilizers, dyes, etc., used generally in this field.

The examples that follow herewith are given for purely illustrative and not limiting purposes.

EXAMPLE 1

49 g of anhydrous magnesium chloride, 78.1 g of anhydrous ethyl alcohol and 1,155 ml of vaseline oil, produced by Montedison S.p.A. under the trade name of ROL OB/30, were loaded under an inert gas atmosphere and at room temperature, into a 2 liter autoclave fitted with a turbine stirrer and drawing pipe.

The reaction mass was then heated to 120° C. under stirring and an adduct was obtained of $MgCl_2$ with 3 moles of ethyl alcohol, which melted and remained mixed with the dispersant (vaseline oil). The autoclave was thereupon brought up to a pressure of 10 kg/cm$^2$ by introduction of inert nitrogen gas.

The drawing pipe of the autoclave is connected through a cock with a pipe having an inside diameter of 1 mm and a length of 3 meters, said pipe being externally heated at 120° C.

The cock was then opened to allow the mixture to flow through the pipe. The linear outflow rate of the mixture in the pipe was equal to about 4.5 m/sec.

At the outlet of the pipe, the dispersion was gathered in a stirred 5 liter flask containing 2.5 liter of anhydrous heptane, externally cooled and maintained at an initial temperature of −40° C. The final temperature, after collecting the emulsion coming from the autoclave, was 0° C.

The spheroidal solid product that forms the dispersed phase of the emulsion, was separated by decanting and filtering, was then washed with heptane.

All these operations were carried out under an atmosphere of an inert gas.

After drying, carried out under vacuum and at room temperature, there were obtained 102 g of a solid, spherical product $MgCl_2 \cdot 2.77 C_2H_5OH$, which, subjected to screening, yielded the following particle size analysis:

| micron | % |
|---|---|
| 74–105 | 0.4 |
| 50–74 | 5.5 |
| <50 | 94.1 |

11.7 g of the <50 micron fraction of the above described adduct were suspended in 80 ml of anhydrous n-heptane in a 500 ml test tube fitted with a porous diaphragm and a stirrer. While maintaining the temperature between 0° C. and 5° C., 200 ml of a 0.85 molar heptane solution of triethyl aluminum were dripped in 1 hour, and under stirring, into the test tube. The whole was then heated at 80° C. for 2 hours. Thereafter the mixture was filtered and then washed five times with 120 ml of n-heptane at 80° C., each time stirring for 20 minutes. The $MgCl_2$ thus obtained, after drying at 45° C. under vacuum showed a specific surface area of 844 m$^2$/g and a porosity of 0.61 cc/g. The product thus activated was suspended in 100 ml of n-heptane and into this suspension there were dripped, at room temperature, in 1 hour and under stirring, 7.5 ml of a heptane solution containing 1.1 g of ethyl benzoate, whereafter the whole was heated at 80° C. for 2 hours. The mixture was then filtered and washed 5 times with 120 ml of heptane at 80° C., each time stirring for 20 minutes. The mixture was then filtered and dried under vacuum at 45° C.

To the $MgCl_2$ were then admixed 80 ml of $TiCl_4$ under stirring, and the mixture was heated at 110° C. for 2 hours. The product was then filtered and the treatment on the solid product was repeated with further 100 ml of $TiCl_4$ for 2 hours, also at 110° C.

The mass was filtered, cooled down to 80° C. and then washed with portions of 120 ml of heptane at 80° C. until attaining complete disappearance of Cl ions in the filtrate. The whole was then dried under vacuum at 45° C., thereby obtaining 6.8 g of a solid catalytic component containing 1.64% by weight of Ti and 7.3% by weight of ethylbenzoate and showing the following characteristics:

| | |
|---|---|
| porosity | 0.391 cc/g |
| specific surface | 393. m$^2$/g |
| mean pore radius | 20. Å. |

The solid catalytic component thus prepared has been used for the suspension polymerization of the propylene. 5 millimols of a heptane solution of an Al-trialkyl mixture, having a gas composition, after hydrolysis, of:

| | % by volume |
|---|---|
| ethane | 9. |
| isobutane | 49.4 |
| n-butane | 41.2 |
| propane | 0.16 |
| isobutene | 0.24 | are reacted at room temperature with 1.25 millimoles of methyl paratoluate diluted in 80 ml of anhydrous and de-sulphurated for 5 minutes in n-heptane. 50 ml of this solution were put into contact with 61 mg of the catalytic component prepared according to the above described system. The remaining ml were diluted with n-heptane to 1,000 ml and were then introduced under nitrogen pressure into a stainless steel 3,000 ml autoclave, fitted with a magnetic anchor stirrer and provided with a thermometer, heat-regulated at 50° C., into which autoclave the gaseous propylene was caused to flow.

The suspension of the catalytic component was then introduced in the same way. After sealing the autoclave, hydrogen was fed into it until attaining a partial pressure of 0.3 atmospheres after which the suspension was heated up to 70° C. while simultaneously feeding in propylene up to attaining a total pressure of 7 atmospheres. Said pressure was maintained constant for the whole duration of the polymerization while continuing to feed in the monomer. After 4 hours the polymerization was interrupted. 220 g of polypropylene were obtained which were separated for treatment with methanol and acetone. The results of the polymerization test are recorded in Table I.

EXAMPLE 2

28.4 g of anhydrous $MgCl_2$ and 49.5 g of anhydrous ethanol, 100 ml of vaseline oil ROL OB/30 and 100 ml of silicone oil (viscosity 350 cs) were introduced, under an inert atmosphere, into a flask immersed in a heat stabilized bath at 120° C. and under stirring until the $MgCl_2$ was completely dissolved. Thereby there was formed the $MgCl_2$ adduct with ethanol in admixture with the oils. The hot mixture was then transferred, still under an inert atmosphere, to a 1,500 ml vessel provided with a heating jacket, and containing 150 ml of vaseline oil and 150 ml of silicone oil. This mixture was maintained at 120° C. and kept under stirring by means of a stirrer of the Ultra Turrax T-45 N type produced by Janke & Kunkel K. G. Ika Werke. The mixture was stirred for 3 minutes at 10,000 rpm. Thereupon, the mixture was discharged into a 2 liter vessel containing 1,000 ml of anhydrous n-heptane which was kept under stirring and cooled so that the final temperature did not exceed 0° C.

The $MgCl_2 \cdot 3EtOH$ microspheres thus obtained, after filtering, were dried under vacuum at room temperature and then screened, whereupon they yielded a fraction <50 micron corresponding to 78% by weight. By activation as described in Example 1, these microspheres yielded a solid catalytic component containing 1.95% by weight of Ti and 7.5% by weight of ethylbenzoate, while showing the following characteristics:

| | |
|---|---|
| porosity | 0.322 cc/g |

| | | |
|---|---|---|
| specific surface | 397. | m²g |
| mean pore radius | 16. | Å. |

46.3 mg of this catalytic component were used in the polymerization of propylene under the conditions indicated in Example 1. There were thus obtained 170 g of polypropylene. The results are recorded in Table I.

EXAMPLE 3

25.25 g of $MgCl_2.2.77C_2H_5OH$, in the form of microspheres with a particle size lower than 50 micron, obtained by operating according to the process described in Example 1, were suspended in 150 ml of anhydrous n-heptane in a 500 ml flask fitted with a stirrer and immersed in a heat stabilized bath kept at 0° C.

In this suspension there were dissolved 21.6 ml of a 1 molar heptane solution of ethylbenzoate, and it was then allowed to react under stirring for 10 minutes. To the suspension, still at 0° C., there were admixed 100 ml of undiluted $TiCl_4$.

The heat regulated bath was removed and the suspension was allowed to warm up for 1 hour to room temperature. Thereupon, there were admixed further 150 ml of $TiCl_4$ and the suspension was then heated up to 100° C. The suspension was allowed to react for 2 hours at 100° C. it was then filtered and made to react with 200 ml of undiluted $TiCl_4$ in absence of solvent, under stirring for 2 hours at 135° C. $TiCl_4$ was removed, the solid cooled down to 80° C. and then washed with n-heptane at 80° C. until the elimination of the Cl ions in the filtrate and the solid product was then dried under vacuum at 40° C. The solid catalytic component thus obtained showed the following composition and characteristics:

| | | |
|---|---|---|
| Ti | = | 3.4% by weight |
| ethylbenzoate | = | 11.5% by weight |
| porosity | = | 0.30 cc/g |
| specific surface | = | 372. m²/g |
| mean pore radius | = | 16.2 Å. |

40 mg of the catalytic component were then used in a heptane suspension in the polymerization of propylene according to the method described in Example 1. There were obtained 225 g of polymer. The results are recorded in Table I.

EXAMPLE 4

9 g of $MgCl_2.2.77C_2H_5OH$ in the form of microspheres of less than 50 micron diameter, obtained according to the process described in Example 1, were introduced, under a nitrogen atmosphere, into a 500 ml flask. Thereupon, the product was kept under a stabilized heat of 60° C. and a vacuum was applied until the content in ethyl alcohol of the spheroidized adduct was reduced from the initial 2.77 moles to residual 2 moles. The product was suspended in 150 ml of anhydrous n-heptane, whereupon it was proceeded with the titanation according to the procedures described in Example 3, except that instead of 21.6 ml there were used only 7.5 ml of a heptane solution of 1 molar ethylbenzoate. A catalytic solid compound was obtained showing the following composition and characteristics:

| | | |
|---|---|---|
| Ti | = | 1.95% by weight |
| ethylbenzoate | = | 9.05% by weight |
| porosity | = | 0.39 cc/g |
| specific surface | = | 386. m²/g |
| mean pore radius | = | 20.2 Å. |

43 mg of this catalytic component were used in heptane suspension in the polymerization of propylene according as described in Example 1.

There were thus obtained 182 g of polypropylene and the results are recorded in Table I.

EXAMPLE 5

12 g of $MgCl_2.2.77C_2H_5OH$ in the form of microspheres of less than 50 micron diameter, obtained according to the process described in Example 1, were suspended in 100 ml of anhydrous n-heptane in a 500 ml test tube fitted with a porous diaphragm and a stirrer. Maintaining the temperature at 20° C., 100 ml of $TiCl_4$ were dripped into this suspension. Thereupon, the temperature was brought up to 100° C. and the mass was allowed to react for 2 hours. After filtering at 100° C., the solid was once again suspended in 200 ml of $TiCl_4$ and this suspension was then maintained under stirring at 130° C. for 2 hours. Thereafter, the suspension was filtered and the solid cooled down to 80° C. and repeatedly washed at 80° C. with fractions of n-heptane until achieving the disappearance of the chlorine ions in the filtrate. After drying, the solid catalytic component contained: Ti=7.4% by weight; Cl=6.32% by weight.

8 mg of the solid catalytic component thus prepared (corresponding to 0.6 mg of Ti) and 1,000 ml of anhydrous n-heptane were introduced, together with 2 ml of triisobutyl aluminum, and under nitrogen atmosphere, into a stainless stee 3 liter autoclave fitted with an anchor stirrer and heat stabilized at 85° C.

Thereupon, there were added 4 atm. of $H_2$ and ethylene up to a total pressure of 13 atm., which was maintained constant for the whole duration of the test continuing feeding of monomer.

After 4 hours, the polymerization was interrupted and there were obtained 860 grams of microspheroidal polyethylene, corresponding to a yield of 1,430,000 g of polyethylene/g Ti, with an intrinsic viscosity $[\eta]=2.12$ dl/g.

EXAMPLE 6

Into a 1,000 ml flask were introduced 229 ml of $TiCl_4$ and allowed to react with 2.42 ml of ethylbenzoate, at 15° C. for 10 minutes. Thereupon, at the same temperature and in 50 minutes, into this reaction mass was dripped a suspension containing 17.6 g of $MgCl_2.2.47C_2H_5OH$ in 25 ml of n-heptane, in the form of microspheres with a particle size of less than 50 microns, obtained by operating according to the process described in Example 1.

On completion of the addition, the temperature was brought up to 100° C. and the reaction was completed in 90 minutes. The reaction product was thereupon filtered on a porous diaphragm at reaction temperature and, then, there were added to the filtrate 100 ml of undiluted $TiCl_4$ after which it was allowed to react for further 2 hours at 120° C.

The product obtained was filtered, the solid cooled down to 80° C. and washed with n-heptane at 80° C., until chlorine ions in the filtrate disappeared. The solid, isolated by drying under vacuum, contained:

Ti=3.26% by weight, Ethylbenzoate=9.64% by weight.

The results of the polymerization test of propylene carried out under the same conditions as in Example 1 are recorded in Table I.

EXAMPLE 7

Into a 1,000 ml flask there were introduced 437 ml of TiCl$_4$ and then cooled down to 0° C. At this temperature, in 50 minutes, there were introduced in small portions, alternatively, 16.90 g of MgCl$_2$.2.44C$_2$H$_5$OH (in form of microspheres with a particle size of less than 50μ diameter, obtained by operating according to the process of Example 1), and 16.3 ml of a heptane solution 1 M of ethylbenzoate. The mixture was allowed to react for 60 minutes, bringing the temperature slowly up to 20° C. and then, in 30 minutes, the reaction mass was heated up to 100° C., at which temperature it was allowed to react for 90 minutes. Thereupon, the reaction product was filtered on a porous diaphragm at reaction temperature, after which there were added 200 ml of undiluted TiCl$_4$ and it was then allowed to react at 130° C. for further 2 hours, after which the reaction product was filtered, cooled down to 80° C. and then washed at 80° C. with n-heptane up to the disappearance of the chlorine ions in the filtrate. The solid, isolated by drying under vacuum, contained: Ti=3.43% by weight, Ethylbenzoate=9.50% by weight.

The results of the polymerization test of propylene under the conditions of Example 1 are recorded in Table I.

EXAMPLE 8

14 g of MgCl$_2$.1.9C$_2$H$_5$OH.0.8n-C$_4$H$_9$OH in the form of microspheres with a diameter below 50 micron, obtained by operating according to the process described in Example 1, were used for the synthesis of a solid catalytic component following the procedure of Example 7. The isolated solid showed the following percent analysis by weight: Ti=2.93%, Ethylbenzoate=9.27%.

The results of the polymerization test of propylene under the conditions of Example 1 are recorded in Table I.

What is claimed is:

1. Catalyst components for the polymerization of olefins, which comprise the reaction product of a Ti compound selected from the group consisting of Ti tetrahalides, Ti haloalcoholates and Ti halophenolates with a Mg halide, said catalyst components being in the form of spherical particles having an average diameter comprised within the range of from 1 to 100 micron, a surface area comprised between 300 and 500 m$^2$/g and a porosity comprised between 0.3 and 0.4 cm$^3$/g, and being capable of forming, by reaction with Al-alkyl compounds, catalysts which, when used in a standard test for the polymerization of propylene, yield polymers in the form of spherical particles having a flowability lower than 16 seconds, determined according to ASTM 1895-79 (A), and a bulk density higher than 0.4 g/cm$^3$.

2. Catalyst components according to claim 1, in which the polymers in the form of spherical particles have a flowability of from 12 to 15 seconds.

3. Catalyst components according to claim 1, containing in a combined form an electron-donor compound, in a molar ratio with the Ti compound of from 0.2 to 3.

4. Catalyst components according to claim 1, obtained by reaction of TiCl$_4$ with an adduct MgX$_2$.nROH, wherein ROH is an alcohol, obtained by causing a homogeneous mixture of the adduct, in molten form, and of a liquid that is immiscible and does not react with the adduct, to pass through a predetermined path under conditions of turbulent motion and in quenching the emulsion at the outlet of said path.

5. Carriers for catalysts for the polymerization of olefins, comprising a Mg dihalide, in the form of spherical particles having an average diameter comprised between 1 and 100 micron, a surface area higher than 500 m$^2$/g and a porosity higher than 0.5 cc/g, the catalysts obtained from said carriers being characterized in that, when used in a standard polymerization test, they yield polymers in the form of spherical particles having a flowability lower than 16 seconds, determined according to ASTM 1895-79(A) and a bulk density higher than 0.4 g/cm$^3$.

6. Carriers according to claim 5 the catalysts obtained from said carriers being characterized in that, when used in a standard polymerization test, they yield polymers having a flowability comprised between 12 and 15 seconds.

TABLE I

| Example No. | Yield g polymer/g Ti | [η] dl/g | I.I. | Bulk density | Flowability sec. | % Particle Size <44μ | 44–102μ | 102–107μ | >710μ |
|---|---|---|---|---|---|---|---|---|---|
| 1 | 220,000 | 1.5 | 92.3 | 0.45 | 14. | 0 | 1.7 | 88.3 | 10. |
| 2 | 188,000 | 1.6 | 94.3 | 0.47 | 13. | 0.2 | 2.3 | 94.3 | 3.2 |
| 3 | 166,000 | 1.7 | 94.2 | 0.43 | 15. | 0 | 0.2 | 70.3 | 29.5 |
| 4 | 216,000 | 1.7 | 91.8 | 0.46 | 14. | 0 | 0.4 | 93.1 | 6.5 |
| 6 | 270,000 | 1.8 | 93.1 | 0.455 | 15. | 0 | 0.2 | 60.8 | 39. |
| 7 | 228,000 | 1.9 | 91.6 | 0.48 | 13.6 | 0 | 0.2 | 57.2 | 42.6 |
| 8 | 212,000 | 1.8 | 92.0 | 0.43 | 15. | 0 | 0.3 | 64.7 | 35. |

[η]: the intrinsic viscosity was determined in tetralin at 135° C.

* * * * *